United States Patent [19]

Asano et al.

[11] Patent Number: 4,728,557

[45] Date of Patent: Mar. 1, 1988

[54] MOLDED PART AND METHOD OF MAKING THE SAME

[75] Inventors: Hideki Asano, Mito; Morimichi Umino, Hitachiota; Masanori Nemoto, Ibaraki, all of Japan

[73] Assignee: Hitachi, Ltd., Tokyo, Japan

[21] Appl. No.: 375,584

[22] Filed: May 6, 1982

[30] Foreign Application Priority Data

May 11, 1981 [JP] Japan ............................ 56-69410

[51] Int. Cl.⁴ .................................................. B32B 3/10
[52] U.S. Cl. ...................................... 428/138; 428/140
[58] Field of Search ................ 428/140, 138; 264/273; 360/132

*Primary Examiner*—Marion C. McCamish
*Attorney, Agent, or Firm*—Antonelli, Terry & Wands

[57] ABSTRACT

A molded part including a metal plate formed with a plurality of through holes, a plurality of resin portions connected to a resin filled in the through holes and protruding on opposite sides of the metal plate, the resin portions having a planar cross section larger than a cross section of the through holes, and a plurality of resin components each integrally formed with one of the resin portions. The resin components are secured in place on the metal plate separate from and independent of each other by virtue of residual thermal stress produced by the difference in the coefficient of thermal expansion between the resin portions and the metal plate in such a manner that a radially oriented residual thermal stress in each resin portion is symmetrical with respect to a center axis of one of the resin components.

2 Claims, 16 Drawing Figures

F I G. 10
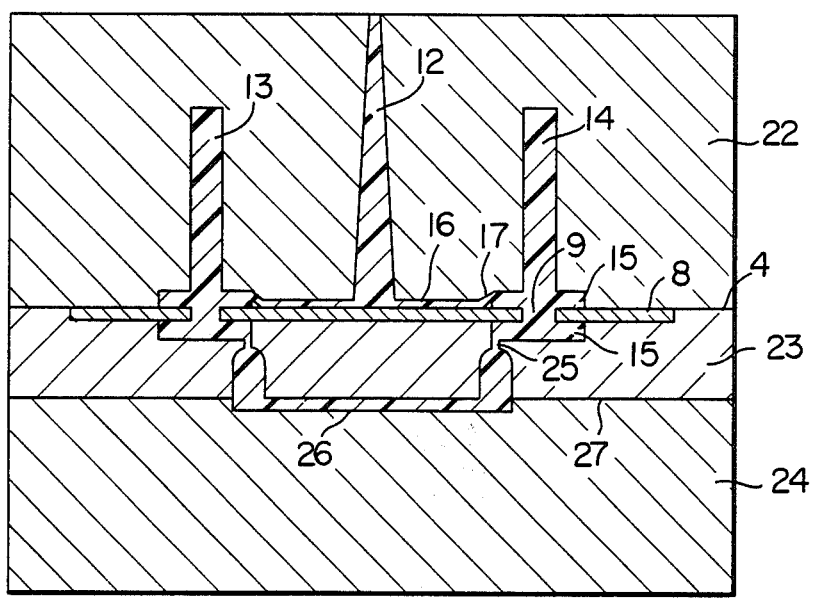

MOLDED PART AND METHOD OF MAKING THE SAME

This invention relates to a molded part and methods of making the same, and, more particularly, to a molded part having a suitable for use as a superprecision part, such as a chassis of a video tape recorder (hereinafter VTR) in particular, and a method for producing the same.

Molded superprecision parts are required to be free from deformation, such as warping, that might be caused by residual thermal stress in the resin portions, let alone to have high dimensional accuracy at the time of shaping. To attain the end, proposals have been made to provide the shaping runners with cutouts to shape resin structures and arrange the same in the positions on through holes formed in the metal plate, as disclosed in Japanese Patent Application Laid-Open No. 16586/79, for example. This process is intended to have cracks formed by residual thermal stress in the cutouts in the runners, to thereby release the thermal stress. However, some disadvantages are associated with this process. For example, since the process contemplates forming of cracks in one portion of the part, the distance between the resin structures may undergo changes. Also, when runners are located on opposite surfaces of the metal plate, the runner on one surface would warp in the opposite direction due to the action of residual thermal stress in the runner on the other surface if the runner on one surface is cut. Moreover, when the molded parts are superprecision parts, such as chassis for VTRs, that are assembled with other parts, the runner cut at the cutouts might be separated from the metal plate and warp in the direction of other parts, ultimately coming into contact therewith. When this happens, the equipment would be prevented from functioning properly. This trouble would occur when the runners formed with no cutouts are subjected to creep rupture due to residual thermal stress.

Accordingly, this invention has as its object the provision of molded part having high dimensional stability without interfering with the functioning of other equipment, and an method for obtaining such part.

A first outstanding characteristic of the molded part according to the invention is that a resin component is formed in the position of each of at least two through holes of a plurality of through holes formed in the metal plate in such a manner that the resin components disposed in the positions of the respective through holes are separate from and independent of each other.

A second outstanding characteristic is that the resin components are formed such that the radially directed residual thermal stress at a lower end portion of each resin component (a resin portion facing the metal plate) is symmetrical with respect to the axis of the respective resin component or that such thermal stress is equally divided by the axis in the center. The molded part according to the invention is such that the runners which might interfere with the functioning of other equipment or deteriorate dimensional stability of the shape are suitably removed, for example. When the molded part is a chassis of a VTR, the runners are preferably removed on the entire surface of the chassis or the entire two surfaces of the metal plate. When the resin components are arranged such that they hold therebetween equipment that is accurately positioned, runners of the resin structures (structures each consisting of a resin component and a resin portion) should be removed. The same applies to the resin components arranged to hold therebetween a portion of the driving range of other equipment. However, in cases where the resin components themselves are too close to each other to give rise to the danger of the metal plate warping or the runners cracking, the runners may be left unremoved in the shape. Those runners which are located in positions where warping of the base plate or other trouble is not likely to arise may be left unremoved.

Portions of the resin structures having no runners that involve the surfaces of the metal plate are preferably polygonal or circular in shape with the corresponding through holes at the center. These portions each constitute the essential portion of a resin structure which is usually a resin flange portion of a resin component. If the resin component is a polygonal post or a column as a whole, the resin flange portion constitutes a portion of the resin component.

In the method according to the invention, it is important that the sprue runner that becomes a runner after molding is effected and the resin structures be severed from each other when the metal mold is removed. The sprue runner opens in cavities formed in the metal mold. It is necessary that the position in which the sprue runner opens in the cavities in a position which exerts no influences on the function of the resin structures and the precision thereof. Such position is a resin flange portion in which the resin is introduced at the peripheral end portion through the sprue runner toward the center axis of each resin component. The sprue runner is usually connected to a main runner formed along the parting surface of the metal mold and an ancillary runner not emerging at the parting surface. In this case, the resin flows through the main runner and the ancillary runner in the indicated order into the cavity. Moreover, in the present invention, the resin structures are securely held in place on the metal plate by virtue of a residual thermal stress produced by a difference in coefficient of thermal expansion between the resin flange portions, the resin extending through the plate through-holes, and the metal plate.

Additional and other objects, features and advantages of the invention will become apparent from the description set forth hereinafter when considered in conjunction with the accompanying drawings, in which:

FIG. 1 is a sectional view of the metal mold;

FIG. 2 is a plan view of the metal plate;

FIG. 3 is a sectional view of the metal mold after receiving a charge of resin filled therein and the resin portion;

FIG. 4 is a perspective view, on an enlarged scale, of the A section shown in FIG. 3;

FIG. 5 is a sectional view of the metal mold and the shape in explanation of the step of removing the shape from the metal mold shown in FIG. 3;

FIG. 6 is a sectional view of the shape; and

FIGS. 7 and 8 are sectional views of a molded part of the prior art shown for the purpose of comparison with the embodiment of the invention.

FIGS. 9–16 are views in explanation of the molded part and the method comprising another embodiment of the invention.

FIGS. 9 and 11–15 are sectional views of the metal mold and the molded part respectively, in explanation of the step of removing the molded part from the metal mold;

FIG. 10 is a sectional view of the metal mold after receiving a charge of resin filled therein and the resin portion; and FIG. 16 is a sectional view of the molded part.

Figure 1:
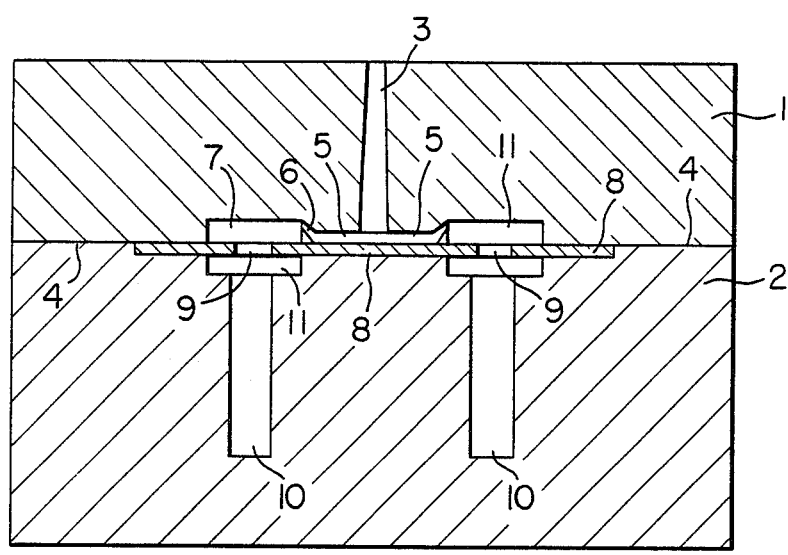
FIGS. 1–8 are views in explanation of the molded part and the method comprising one embodiment of the invention.
Figure 2:
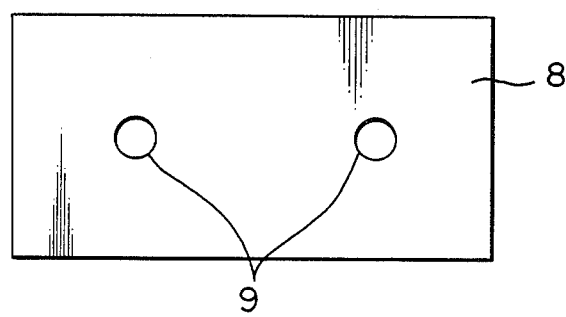

Preferred embodiments of the invention will now be described by referring to the accompanying drawings.

As shown in FIGS. 1-6, a metal mold consists of mold members 1 and 2, with the mold member 1 being formed with a sprue 3 opening at a parting surface 4 and connected to a main runner 5 extending along the parting surface 4. The main runner 5 extends linearly and includes opposite end portions submerged in the interior of the mold member 1 from the parting surface 4. These portions of the main runner 5 form an ancillary runner 6 opening at its forward end in cavities 7 at the peripheral end portion of the mold member 1 (this construction of the submerged ancillary runner 6 is referred to as a submarine gating system). The opening of the ancillary runner 6 in the cavities 7 has only to have a size large enough to allow the resin to flow therethrough. The cavities 7 extend from the mold member 1 to the mold member 2. A metal plate 8 is located between the two mold members 1 and 2 and formed with through holes 9 therein in positions corresponding to the cavities 7 located in a manner to completely enclose the openings of the through holes 9. A portion of each cavity 7 on the metal mold 2 side is composed of columnar portions 10 and disc-shaped portions 11 having circular portions each concentric with one of the through holes 9.

Figure 3:
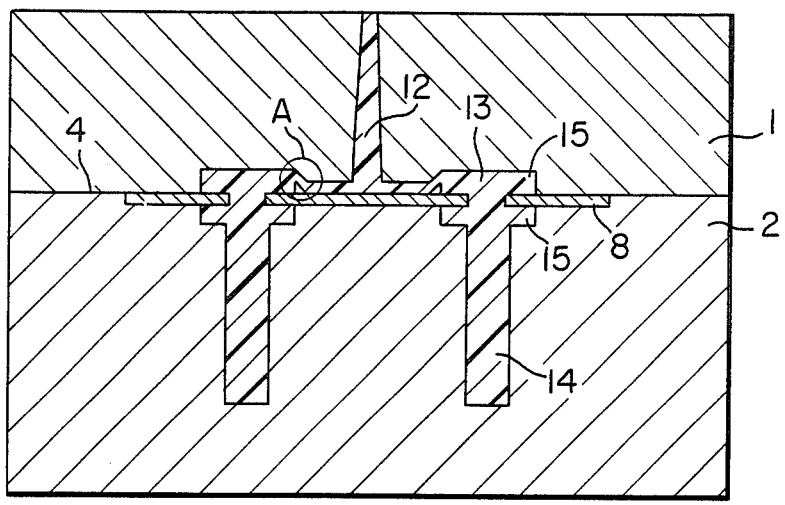
Figure 4:
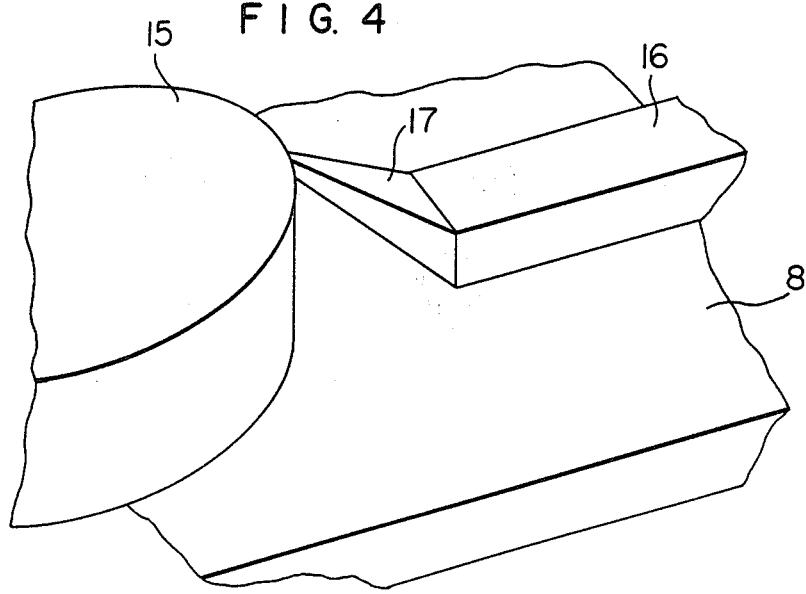
Figure 5:
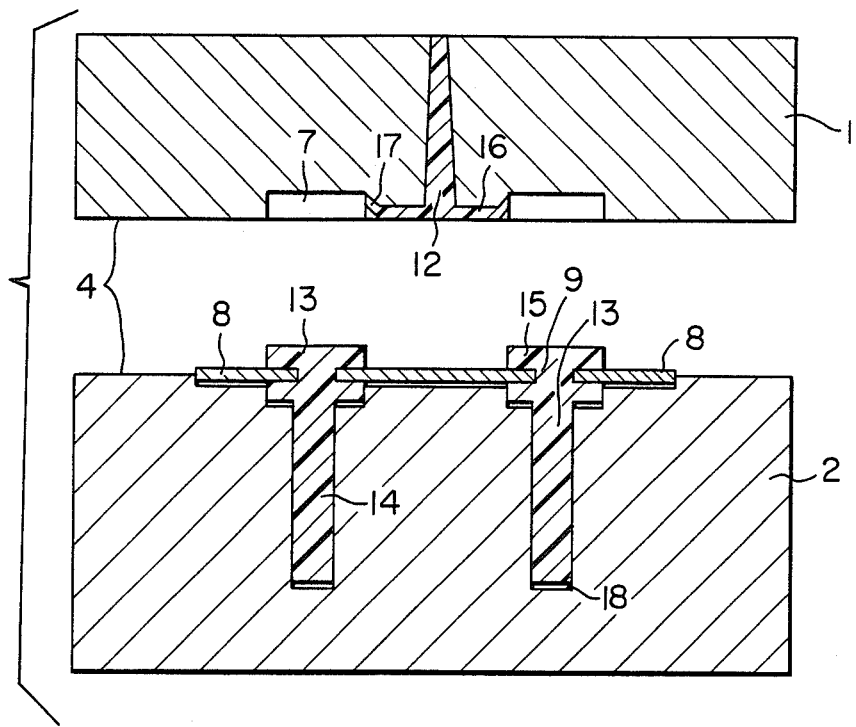

As shown most clearly in FIGS. 3 and 4, the resin is introduced into the cavities 7 through the sprue 3. A runner 12 is formed in the sprue 3 and resin structures 13 are formed in the cavities 7. The columnar space portions 10 and disc-shaped space portions 11 provide resin components 14 and resin flange portions 15, respectively. The resin flange portions 15 of course enclose the through openings 9 of the metal plate 8 completely. The runner 12 is connected to a main runner 16 formed in the main runner 5 and an ancillary runner 17 formed in the ancillary runner 6 which is connected to the resin flange portions 15.

The metal mold is removed after the resin filled in the cavity 7 has set. By separating the two mold members 1 and 2 from each other, the runner 12 is severed from the mold member 2 and resin structures 13 (resin flange portions 15) together with the mold member 1. This is due to the fineness of the ancillary runner 17 and the parting resistance. Also, the fact that the ancillary runner 17 is submerged in the mold member 1 is a contributing factor. The mold member 2 is removed after the mold member 1 is removed. At this time, the major portion of the resin structures 13 or the resin components 14 are withdrawn while being supported in holes 18 (see FIG. 5) in the mold member 2. The runner 12 left in the mold member 1 is removed therefrom and crushed for further use.

Figure 6:
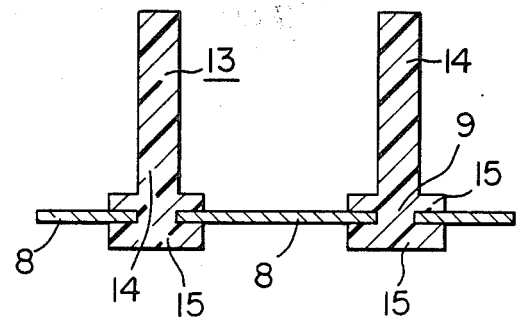

Removal of the mold members 1 and 2 as described hereinabove provides an molded part shown in FIG. 6. It will be seen that the molded part obtained in this manner has the runners 12 removed from opposite sides of the metal plate.

The embodiment of the invention described hereinabove can achieve the following effects:

(1) The fact that the embodiment of the molded part in conformity with the invention has the runner 12 removed from opposite sides of the metal plate 8 contributes to improved dimensional stability of the molded part. This embodiment has particular utility in cases where a plate of aluminum alloy or a steel plate of about 1 mm thick is used as the metal plate 8 to obtain a reduced weight in a shape.

Figure 7:
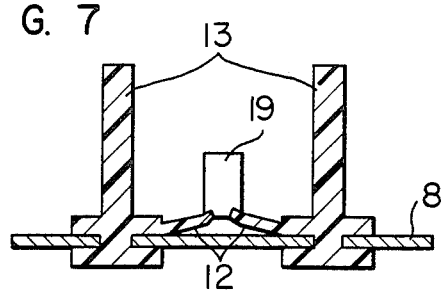
Figure 8:
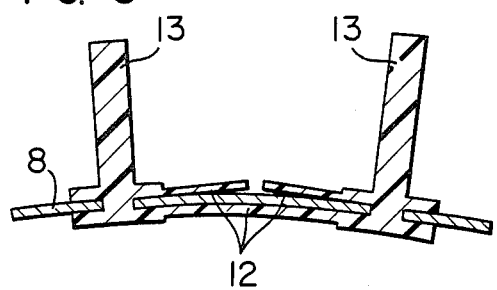

FIGS. 7 and 8 show examples of shapes of the prior art for comparison with the shape according to the invention. The molded part shown in FIG. 7 has the runner 12 left between the resin structures 13. Assume that another part 19, such as a drive member, is located between the resin structures 13. Then the runner 12 would suffer crack formation due to creep rupture caused by residual thermal stress, and the ruptured runner 12 would separate itself from the metal plate 8 until the runner 12 strikes the drive member 19 and interferes with its functioning (rendering the drive member 19 inoperative, for example). In FIG. 8 the runners 12 are formed on opposite sides of the metal plate 8. If creep cracks were formed in one runner 12, buckling of the metal plate 8 would occur due to the effect of the other runner 12 on the opposite side.

The aforesaid problem arising in the parts of the prior art shown in FIGS. 7 and 8 stems from the presence of the runners 12. The problem is obviated by the present invention in which the embodiment of the molded part has no runners 12 on opposite sides of the metal plate 8. That is, the embodiment of the molded part does not interfere with the functioning of other parts or equipment and has high dimensional stability, so that it has particular utility as a superprecision part, such as a chassis of a VTR.

The absence of the runner 12 has the following side effects when the part is assembled with other parts. (a) Assembling with other parts is not interfered with; (b) the part can have parts mounted on opposite sides; and (c) the article obtained by assembling the part with other parts can have its size reduced. The removal of the runners 12 is conducive to reduced weight of the product.

(2) The resin flange portions 15 of the embodiment of the molded part in conformity with the invention are in the form of discs concentric with the through holes 9. Thus, residual thermal stress is uniformly applied to the flange portions 15 peripherally thereof. This is conducive to prevention of dimensional instability that might cause toppling of the resin structures 13.

(3) The embodiment of the method in conformity with the invention uses a submarine gating system. This enables removal of the runners 12 to be smoothly effected when the metal mold is removed from the product. Particularly the fineness of the runner 17 facilitates severing of the runners 12 from the resin flange portions 15.

(4) The presence of the main runner 16 at the parting surface 4 facilitates removal of the runners 12 in the metal mold after the molded part is removed from the metal mold.

(5) Thermal stress remains in portions directly connected to the gate. In the embodiment, the ancillary runner 6 opens in the cavity 7 on the peripheral end of the mold member 1. This position exerts no influences on the functioning of the resin structures 13 and the precision thereof. Stated differently, this is the most suitable position for the ancillary runner 6 to open in the cavities 7. Additional operations, such as burr-removing, that might otherwise have to be performed on the resin structures 13 after removal of the metal mold can be eliminated.

(6) The resin structures 13 can be accurately positioned because the resin components 14 are supported in the holes 18 when the molded part is removed from the mold member 2. Thus, the molded part according to the invention has high dimensional stability.

Figure 9:
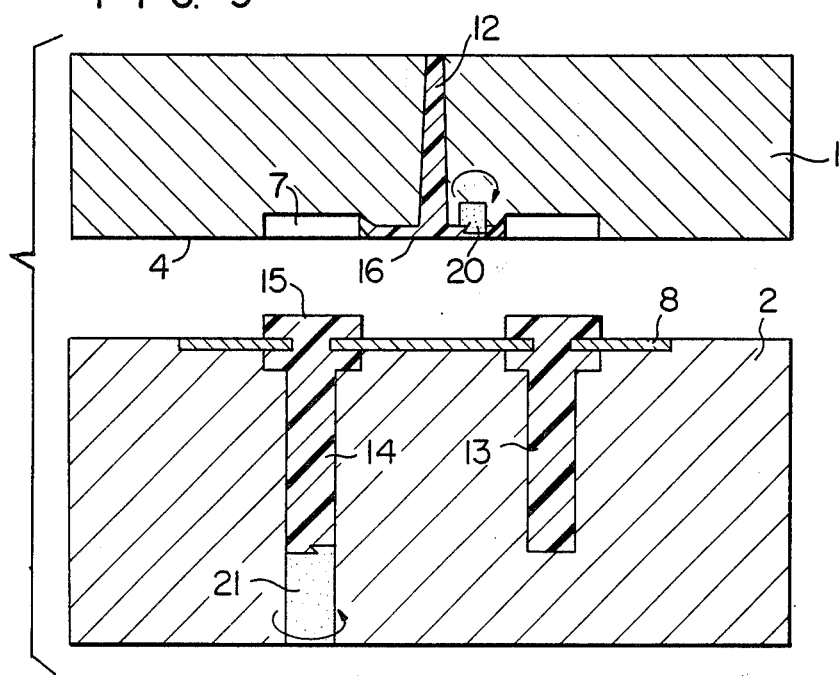

In FIG. 9, a claw 20 is mounted on the main runner 5 in the mold member 1, and a pin 21 projecting from the end of the mold member 2 into one of the cylindrical space portions 10 is mounted at its end. The claw 20 and projecting pin 21 are both hooked to catch against the runners 12 and the resin structures 13. The claw 20 and projecting pin 21 are rotatable in the direction of an arrow and the pin 21 is adapted to slide in the hole 18. The embodiment shown in FIG. 9 is identical with the first embodiment shown in FIG. 1 in other parts. The number of the claw 20 and projecting pin 21 can be suitably deviced.

In this embodiment, the part is removed from the metal mold in the same manner as described by referring to the embodiment shown in FIG. 1. Additionally, the part is pushed out by the projecting pin 21 when the former is removed from the mold member 2. The runners 12 and the part are ultimately removed from the metal mold as the claw 20 and pin 21 are rotated as aforesaid.

This embodiment can achieve the same effects as achieved by the embodiment shown in FIG. 1. Particularly the provision of the claw 20 and pin 21 enables the effects achieved by the embodiment shown in FIG. 1 as described in paragraph (3) with regard to severing and removal from the mold, paragraph (4) with regard to runner removal and paragraph (6) with regard to dimensional stability to be achieved with increased smoothness.

In the embodiment, the claw 20 is provided as an entity separate from the mold member 1 and runners 12. However, the invention is not limited to this specific form of claw. What is essential is that when the mold member 1 is separated from the mold member 2, the claw 20 performs the functions of keeping the runners 12 hitched to the mold member 1, so that severing of the resin flange portions 15 of the part and the ancillary runner 17 can be smoothly effected.

Figure 11:
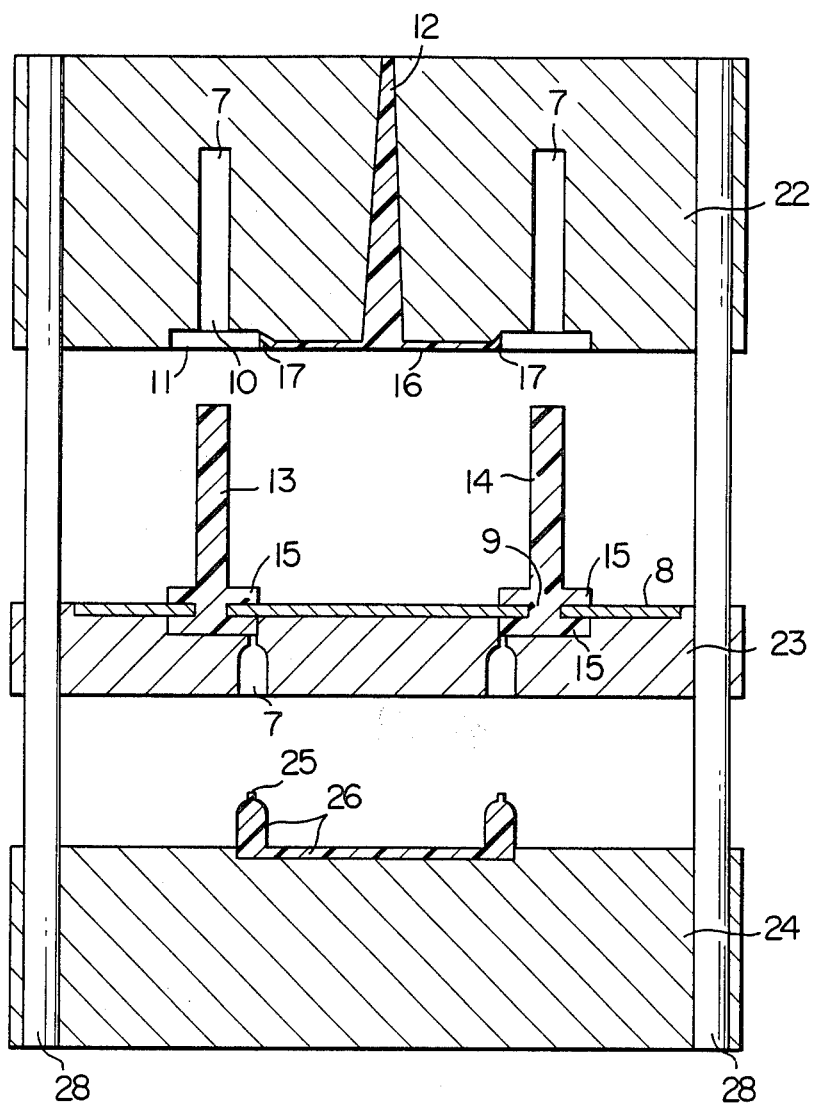

A still another embodiment is shown in FIGS. 10 and 11. In some cases, runners are preferably provided to opposite sides of the metal plate in view of the fluidity of the resin. This embodiment relates to a method of producing such a part.

In this embodiment, the metal mold consists of three mold members 22, 23 and 24. The metal plate 8 is placed in a recess in the mold member 23, and the mold member 22 is placed thereon. The runner 12 is formed in the mold member 22 and connected to the main runner 16 located at the parting surface 4 and connected through the ancillary runner 17 to the peripheral end of the resin flange portions 15 on the mold member 22 side. The direction in which the resin structures 13 are formed is distinct from the corresponding direction of the previous two embodiments in that the resin components 14 are formed in the mold member 22. The resin flange portion 15 is also formed on the undersurface side of the metal plate 8 or on the mold member 23 side. A main runner 26 is connected through an ancillary runner 25 to the resin flange portions 15 at the peripheral end thereof in the mold member 23 also. The major portion of the main runner 26 is located at a parting surface 27 between the mold members 23 and 24 and connects at its opposite ends the two resin structures 13 together in the mold member 23. In other respects, the embodiment shown in FIGS. 10 and 11 is similar to the two previous embodiments.

The process for removing the part from the metal mold in this embodiment is shown in FIG. 11. The three mold members are separated from one another by a slider 28. At this time, the runner 12 remains in the mold member 22, and the main runner 26 and ancillary runner 25 remain in the mold member 24, to be severed from the resin portions of the part. This separation is achieved, as in the two previous embodiments, by virtue of the submarine gating system, the fineness of the ancillary runners 17 and 25 and the parting resistance offered by the resin. In other respects, this embodiment is similar to the two previous embodiments.

This embodiment is also capable of achieving the effects described hereinabove by referring to the first embodiment in paragraphs (1)–(6). An additional advantage offered by the embodiment is that inflow of the resin into the cavity takes place smoothly, to thereby enable nonuniform distribution of residual thermal stress in the resin structures 13 to be avoided.

Figure 12:
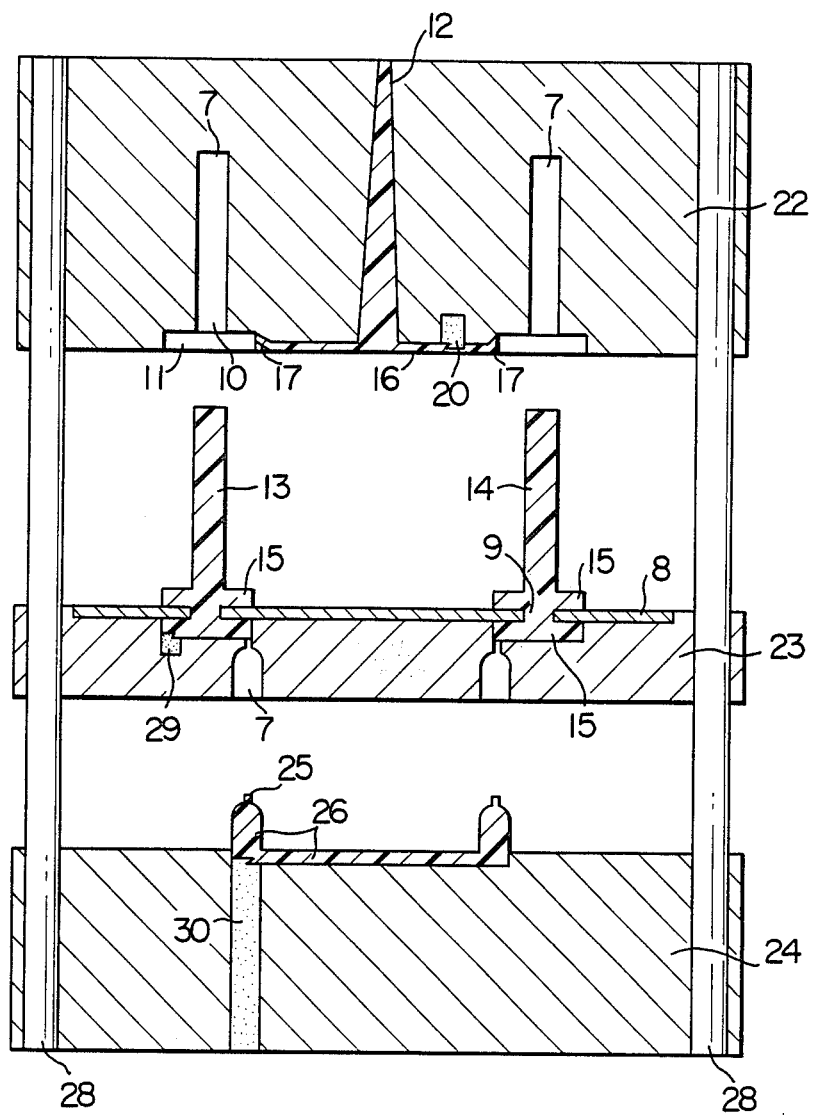

FIG. 12 shows a modification which has, like the embodiment shown in FIG. 9, the claw 20 for catching against the main runner 16. In addition, it has a claw 29 for catching against the part and a projecting pin 30 for catching against the main runner 26. In this modification, separation of the part from the runners takes place more smoothly than in the embodiment shown in FIGS. 10 and 11.

Figure 13:
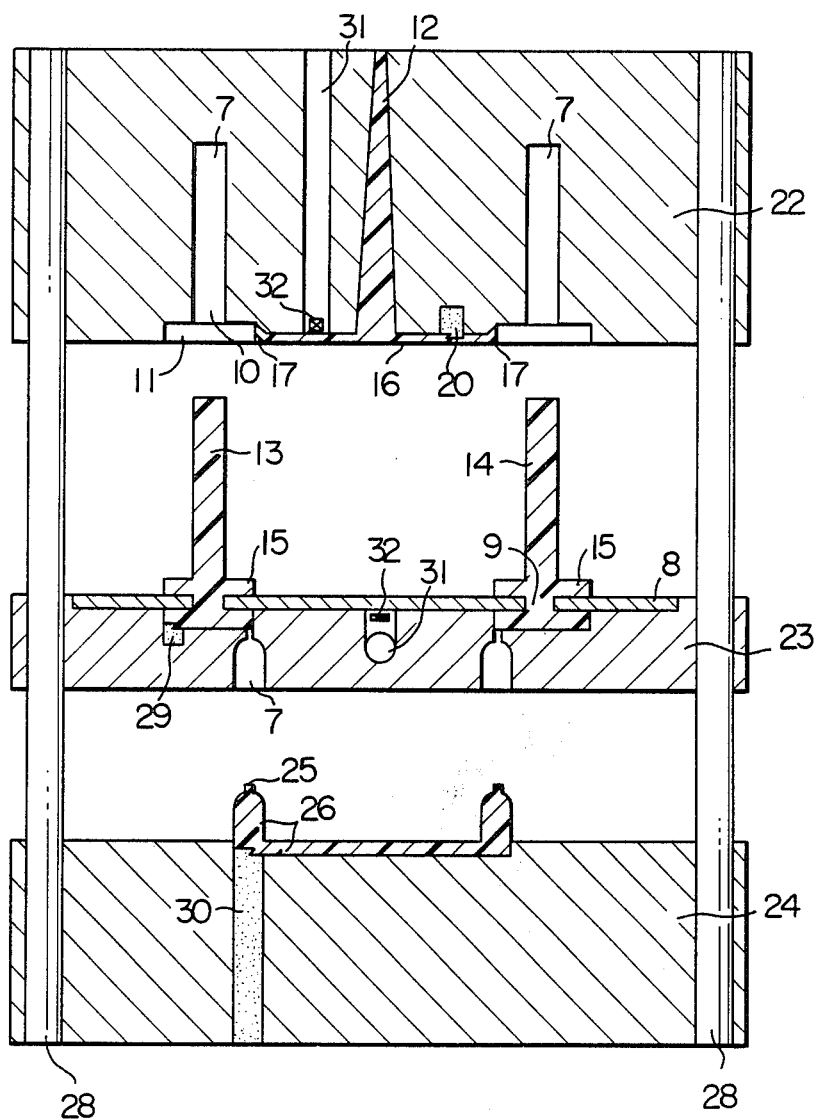

FIG. 13 shows another modification in which are currents are used as means for separating the part from the metal mold. The mold members 22 and 23 are each formed with an air hole 31, and an air valve 32 is mounted on the undersurface of each of the main runner 16 and metal plate 8. When the part and the runner 12 are separated from the mold members 23 and 22, respectively, after the metal mold is split into the three mold members, air currents are blown through the air holes 31 and air valves 32, to enable the separation to take place more smoothly. A combined use of more than two types of means for separating the part and runners from the metal mold (the projecting pin and the air currents, for example) is of course possible as in this embodiment.

Figure 14:
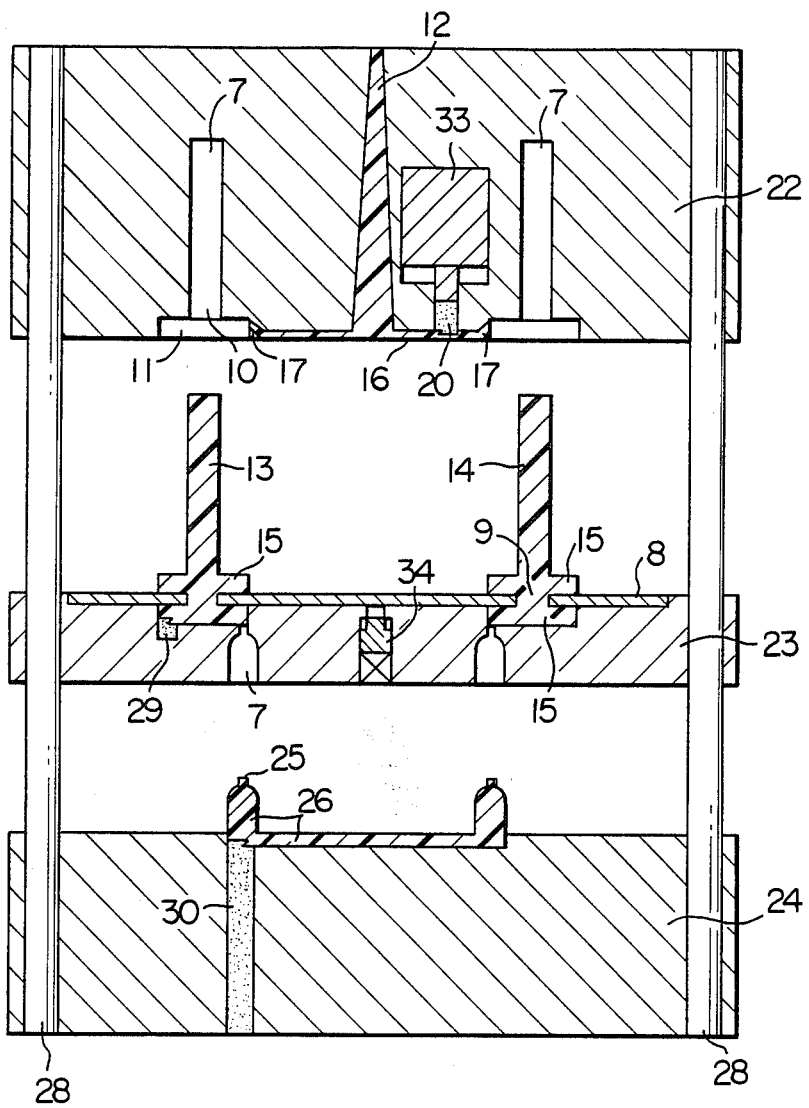

FIG. 14 shows a modification in which hydraulic cylinders are used as means for separating the part and runners from the metal mold. A hydraulic cylinder 33 is mounted in the mold member 22 and has attached to its forward end the claw 20, and another hydraulic cylinder 34 is mounted in the mold member 23 in place of the air hole 31 and air valve 32 shown in FIG. 13. In separating the runner 12 and the part from the mold members 22 and 23, respectively, the hydraulic cylinders 33 and 34 are actuated, to enable the separation to be performed smoothly. The hydraulic means may be one that has a shaping machine connected thereto.

Various other means and methods may be used for separating the runners from the resin structures forming a molded part and separating them from the metal mold. For example, the part may be separated from the runner 12 while evacuating the undersurface of the metal plate of the part by means of a vacuum pump, and then it may be separated from the metal mold by rendering the vacuum pump inoperative.

In the interest of brevity, all the embodiments shown and described hereinabove are molded parts each having two resin structures. It is to be understood, however, that the invention is not limited to this specific number of resin structures and that the invention can have application in molded parts having more than three resin structures.

Figure 15:
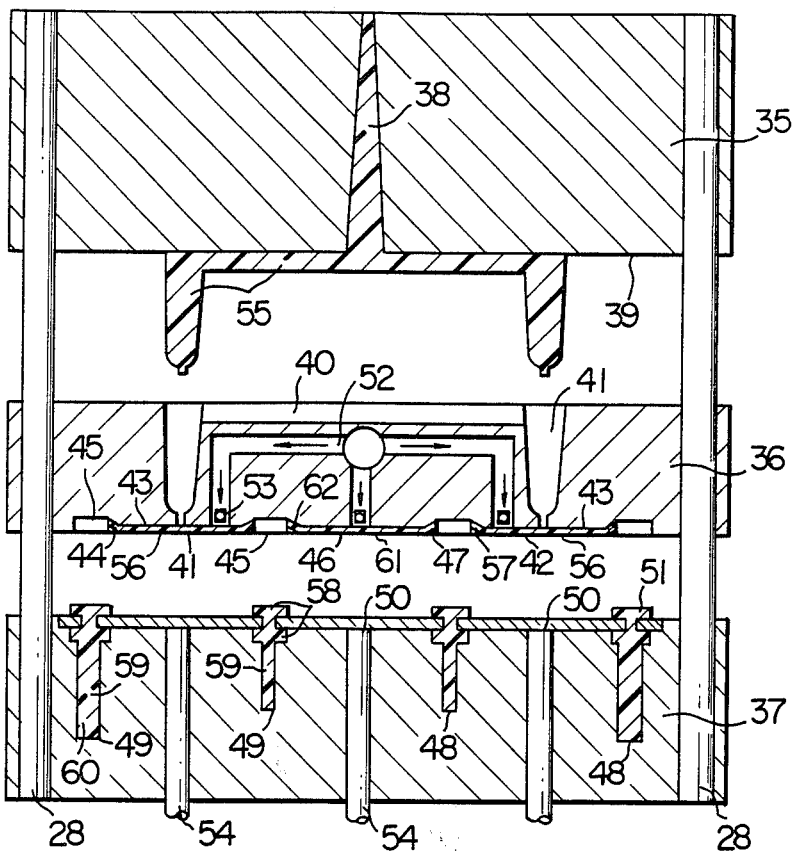

FIG. 15 shows a method for producing a molded part having four resin structures.

In this embodiment, the metal mold is composed of mold members 35, 36 and 37. The three mold members are movably connected together by a slider 38. The mold member 35 is formed with a sprue 38 opening in a runner 40 located along a parting surface 39 between the mold members 35 and 36. The mold member 36 is formed with runners 41 in each of which one of opposite ends of the runner 40 opens. The runners 41 open in a main runner 43 located along a parting surface 42 between the mold members 36 and 37. The main runner 43 is submerged at its opposite ends in the mold member 36 from the parting surface 42, to provide an ancillary runner 44 opening in a total of four disc-shaped space portions. A main runner 46 and an ancillary runner 47 are formed between the two central disc-shaped space portions 45. The mold member 37 is formed with cavities 49 composed of disc-shaped space portions 45 and columnar space portions 48 corresponding to the disc-shaped space portions 45 in the mold member 36. A metal plate 50 is placed on a parting surface of the mold member 47 and formed with four through holes 51 each of which is related to one of the disc-shaped space portions 45 as described by referring to the previous embodiments. The mold member 36 is further formed with three air holes 52 each opening through an air valve 53 to main runners 43 and 46. The mold member 37 has mounted between a plurality of cavities 49 a plurality of projecting pins 54 in such a manner that the cavity 49 and the pin 54 are alternately located and the pins 54 have end surfaces appearing in the main runners 43 and 46.

In this embodiment, the resin flows through the sprue 38, runner 40, runners 41, main runner 43 and ancillary runner 43 in the indicated order before being introduced into the cavities 49. Thus, a runner 55, a main runner 56 and an ancillary runner 57 are formed, and then resin structures 60 each composed of a resin flange portion 58 and a resin component 59 are formed. The resin flows through the main runner 46 and ancillary runner 47 to form a main runner 61 and an ancillary runner 62. The main runner 61 and ancillary runner 62 correspond to the main runner 26 and ancillary runner 25 of the embodiment shown in FIG. 10.

After the resin has set, the metal mold is split into the three mold members. When separation of the mold members from one another is completed, the runner 55 remains in the mold member 35, the main runners 56 and 61 and the ancillary runners 57 and 62 remain in the mold member 36 and the part remains in the mold member 37. The part is withdrawn from the mold member 37 by the projecting pins 54, while the main runners 56 and 61 and the ancillary runners 57 and 62 are removed from the mold member 36 by air currents blown through the air holes 52 and air valves 53.

The embodiment shown in FIG. 15 is capable of achieving the same effects as described by referring to the previous embodiments.

Heaters may be advantageously mounted in the vicinity of the sprue 38 and the runners 40 and 41 to keep the resin in the runner 55 in a molten state at all times. The use of such hot runner enables the mold member 35 and 36 to be combined into a single mold member without being split as it is.

Figure 16:
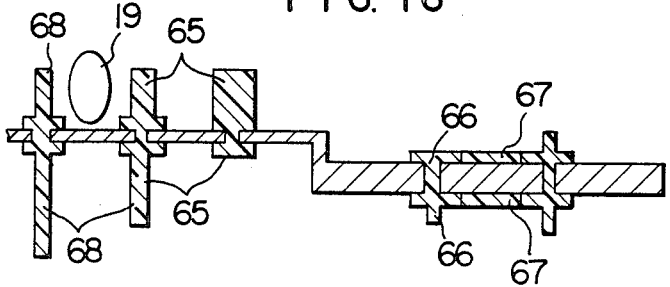

FIG. 16 shows an example of a molded part having the runners partly removed therefrom. In this embodiment, the base plate is composed of a thick metal plate 63 and a thin metal plate 64, and the drive member 19 is disposed close to the thin metal plate 64. In such case, the runners have only to be removed with respect to the resin structures 65 arranged on the metal plate 64. That is, runners 67 associated with the resin structures 66 arranged on the metal plate 63 may be left without being removed. Also, the resin structures 65 may have part mounting portions 68 formed on opposite sides of the metal plate 64. However, removal of the runners should be effected for opposite sides of the metal plate 64 as indicated by this example.

From the foregoing description, it will be appreciated that the invention provides a molded part of high dimensional stability from which runners interfering with functioning of other equipment are removed, and a method of producing such molded part. The invention has particular utility in applications where the metal plate used is low in rigidity to obtain a light weight in the molded part.

The part according to the invention is free from the trouble of buckling of the metal plate or creep rutpure of the resin portions even if the metal plate has low rigidity.

What is claimed is:

1. A molded part, formed in a mold, comprising:
   a metal plate formed with a plurality of through holes; and
   a plurality of molded resin structures, each of said resin structures including a first substantially planar surface portion disposed on a first side of the metal plate, a second substantially planar surface portion disposed on a second side of the metal plate, a further portion integrally formed with and interposed between said first and second substantially planar portions, said further portion extending through the respective through holes in the metal plate, and a substantially columnar portion integrally formed with one of said first and second substantially planar surface portions on a side thereof opposite said further portion, said first and second substantially planar surface portions having a cross-sectional surface greater than a cross-section of the through holes and with said further portion securing the columnar portions in place on said metal plate separate from and independent of each other by virtue of a residual thermal stress produced by a difference in a coefficient of thermal expansion between said first and second substantially planar portions, said further portions and said metal plate; wherein said structures are provided to be separate from and independent of each other when said molded part is removd from said mold, and wherein a radially oriented residual thermal stress in each of said first and second substantially planar surface portions and said further portions is symmetrical with respect to a center axis of each of said molded resin structures.

2. A molded part as claimed in claim 1, wherein the substantially planar surface portions of the molded part are provided without the presence of runners used to feed resin to cavities in the mold, by severing the runners from the substantially planar surface portions when the molded part is removed from said mold.

* * * * *